US012558605B2

(12) United States Patent
Khandelwal et al.

(10) Patent No.: US 12,558,605 B2
(45) Date of Patent: Feb. 24, 2026

(54) ACTIONABLE VOICE COMMANDS WITHIN A CONNECTED FITNESS PLATFORM

(71) Applicant: Peloton Interactive, Inc., New York, NY (US)

(72) Inventors: Ashay Khandelwal, New York, NY (US); Kiran Hemaraj, New York, NY (US); Kenny Kang, New York, NY (US); Michael Lai, New York, NY (US); Nelson Nguyen, New York, NY (US); Sunil Patil, New York, NY (US)

(73) Assignee: Peloton Interactive, Inc., New York, NY (US)

( * ) Notice: Subject to any disclaimer, the term of this patent is extended or adjusted under 35 U.S.C. 154(b) by 250 days.

(21) Appl. No.: 18/545,902

(22) Filed: Dec. 19, 2023

(65) Prior Publication Data

US 2024/0198204 A1 Jun. 20, 2024

Related U.S. Application Data

(60) Provisional application No. 63/476,342, filed on Dec. 20, 2022.

(51) Int. Cl.
| | |
|---|---|
| *A63B 71/06* | (2006.01) |
| *G06T 11/60* | (2006.01) |
| *G10L 15/18* | (2013.01) |
| *G10L 15/22* | (2006.01) |
| *G10L 15/30* | (2013.01) |
| *G10L 15/08* | (2006.01) |

(52) U.S. Cl.
CPC .......... *A63B 71/0622* (2013.01); *G06T 11/60* (2013.01); *G10L 15/1815* (2013.01); *G10L 15/22* (2013.01); *G10L 15/30* (2013.01); *A63B 2071/063* (2013.01); *A63B 2220/807* (2013.01); *G10L 2015/088* (2013.01); *G10L 2015/223* (2013.01)

(58) Field of Classification Search
CPC .......... A63B 71/0622; A63B 2071/063; A63B 2220/807; G06T 11/60; G10L 15/1815; G10L 15/22; G10L 15/30; G10L 2015/088; G10L 2015/223
See application file for complete search history.

(56) References Cited

U.S. PATENT DOCUMENTS

| | | | | |
|---|---|---|---|---|
| 2022/0296966 A1* | 9/2022 | Asikainen | .............. | G16H 20/30 |
| 2022/0384027 A1* | 12/2022 | Kaleal, III | .............. | A61B 5/11 |
| 2023/0107624 A1* | 4/2023 | Keith, Jr. | ................ | G06F 21/32 |
| | | | | 704/249 |
| 2023/0285806 A1* | 9/2023 | Webster | ................... | G06T 7/20 |

\* cited by examiner

*Primary Examiner* — Abul K Azad
(74) *Attorney, Agent, or Firm* — AMPACC Law Group, PLLC

(57) ABSTRACT

A connected fitness platform can determine members are recognized during a live class or other live event, and seamlessly perform actions in response to or along with the recognition. The platform may determine a user or member is being recognized by an instructor or leader of the class/ event, such as by tokenizing usernames and utilizing a semantic database to match or identify members represented by the usernames. The platform may then perform actions for the identified members.

20 Claims, 10 Drawing Sheets

200

210
CAPTURE VOICE SNIPPET SPOKEN BY INSTRUCTOR DURING EXERCISE CLASS

220
EXTRACT USERNAMES FROM VOICE SNIPPET

230
TOKENIZE THE EXTRACTED USERNAMES INTO MULTIPLE TOKENS

240
COMPARE TOKENS TO DATABASE OF TOKENIZED MEMBER NAMES FOR CLASS

250
IDENTIFY MEMBER BASED ON COMPARISON OF TOKENS

210 CAPTURE VOICE SNIPPET SPOKEN BY INSTRUCTOR DURING EXERCISE CLASS

220 EXTRACT USERNAMES FROM VOICE SNIPPET

230 TOKENIZE THE EXTRACTED USERNAMES INTO MULTIPLE TOKENS

240 COMPARE TOKENS TO DATABASE OF TOKENIZED MEMBER NAMES FOR CLASS

250 IDENTIFY MEMBER BASED ON COMPARISON OF TOKENS

200

600

610    DETERMINE HASHTAG WAS SPOKEN BY INSTRUCTOR

620    DETERMINE INTENT OF VOICE SNIPPET

630    PERFORM ACTION FOR MEMBERS ASSOCIATED WITH THE HASHTAG THAT IS BASED ON THE DETERMINED INTENT

ACTIONABLE VOICE COMMANDS WITHIN A CONNECTED FITNESS PLATFORM

CROSS-REFERENCE TO RELATED APPLICATIONS

This application claims priority to U.S. Provisional Patent Application No. 63/476,342, filed on Dec. 20, 2022, entitled ACTIONABLE VOICE COMMANDS WITHIN A CONNECTED FITNESS PLATFORM, which is hereby incorporated by reference in its entirety.

BACKGROUND

The world of connected fitness is an ever-expanding one. This world can include a user taking part in an activity (e.g., running, cycling, lifting weights, and so on), other users also performing the activity, and users doing other activities. The users may be utilizing a fitness machine (e.g., a treadmill, a stationary bike, a strength machine, a stationary rower, and so on), may be moving through the world on a bicycle, and so on.

The users can also be performing other activities that do not include an associated machine, such as running, strength training, yoga, stretching, hiking, climbing, and so on. These users can have a wearable device or mobile device that monitors the activity and may perform the activity in front of a user interface (e.g., a display or device) presenting content associated with the activity.

The user interface, whether a mobile device, a display device, or a display that is part of a machine, can provide or present interactive content to the users. For example, the user interface can present live or recorded classes, video tutorials of activities, leaderboards and other competitive or interactive features, progress indicators (e.g., via time, distance, and other metrics), and so on.

In some cases, live classes include many participants that are also members of a connected fitness platform, service, or network. These members can take classes on exercise machines in their homes or in various locations that have the exercise machines. Thus, the environment can be as large and can accommodate as many participants as there are members accessing a live class via their exercise machines (e.g., via displays associated with their machines). Such an environment can support and/or provide an enhanced interactive class for participating members.

BRIEF DESCRIPTION OF THE DRAWINGS

Embodiments of the present technology will be described and explained by the accompanying drawings.

Figure 1A:
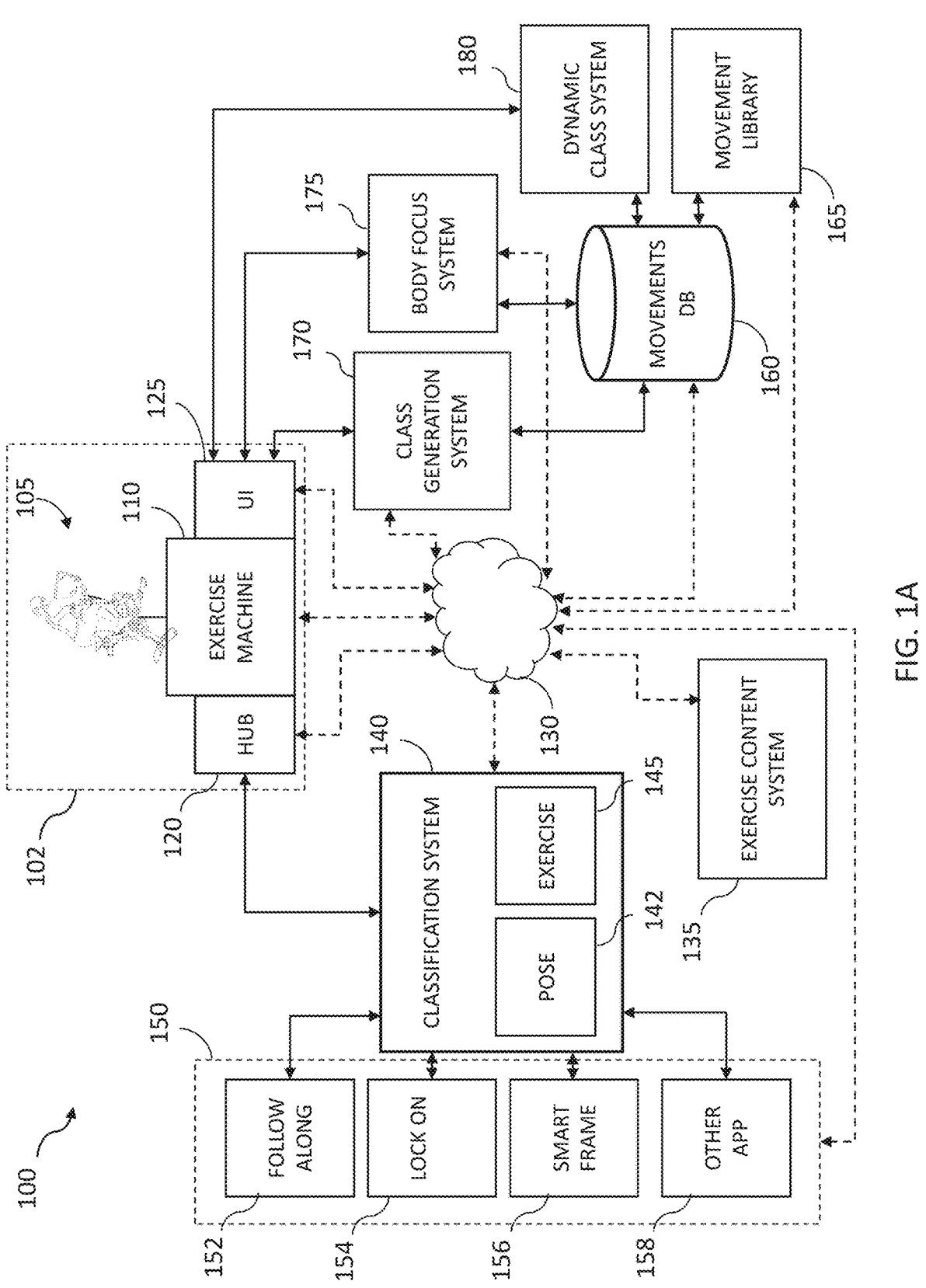
FIG. 1A is a block diagram illustrating a suitable network environment that includes aspects of a connected fitness platform.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

Overview

Various systems and methods that enhance an exercise or other physical activity performed by a user are described. In some embodiments, the systems and methods enhance a live exercise class (e.g., a class streamed to users of exercise machines at remote locations) by determining when an instructor of the exercise class mentions, utters, speaks, or otherwise voices a user's username and performing an action in response to the determination.

Because usernames do not often follow logical semantic patterns or spellings, the systems and methods provide, build, and/or generate a database of tokens associated with the members of the live class (e.g., associated with the usernames that represent the members in the class, such as within a leaderboard for the class). For example, the systems and methods tokenize the usernames of users participating in an exercise class (or other live online event) and identify users related to tokens that match (or match above a certain probability) names spoken or voiced by an instructor during the class.

In some cases, the systems and methods can relate the usernames to tokens stored in a token database or semantic database for all members (or a subset of members) generated for the live class (e.g., generated after the live class commences). For example, the systems and methods can generate the database for all members (e.g., for classes having a total number of members that does not exceed a certain size) or for a subset of members (e.g., for large classes, the database is generated for all members associated with certain milestones (e.g., anniversaries, birthdays, total number of historical classes, and so on) or for members likely to be identified during the class by the instructor.

Further, in some cases, the systems and methods can generate a semantic database for one or more hashtags associated with members of the class or tracked within the connected platform. For example, the database can relate tokens to hashtags or other metadata that groups or categorizes members. The platform may then perform actions for the members when the hashtags are spoked or voiced by the instructor during a class.

In some embodiments, in response to identified, detected, and/or determined voice commands, the systems and methods perform actions for members. For example, the systems and methods can present content to a member that is called out by the instructor during the class, such as an animated visual presentation via the member's display that overlays the presentation of the class.

As another example, the systems and methods can cause a user interface associated with the member to capture a current moment during the class (e.g., a photo or video of the member during the class, a snapshot of the leaderboard or other class state, and so on), can facilitate a social media or network post associated with the member and/or the class, can notify other members associated with the member ("friends" or "connections" to the member) of the event or achievement, and so on.

Thus, the connected fitness platform can determine members are recognized during a live class or other live event, and seamlessly perform actions in response to or along with the recognition, among other benefits. To enable such actions, the platform utilizes various technological hooks or systems to determine a user or member is being recognized by an instructor or leader of the class/event, such as by tokenizing usernames and utilizing a semantic database when matching or identifying members represented by the usernames.

Various embodiments of the system and methods will now be described. The following description provides specific details for a thorough understanding and an enabling description of these embodiments. One skilled in the art will understand, however, that these embodiments may be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Suitable Exercise Platform

The technology described herein is directed, in some embodiments, to providing a user with an enhanced user experience when performing an exercise or other physical activity, such as an exercise activity as part of a connected fitness system or other exercise system. FIG. 1A is a block diagram illustrating a suitable network environment 100 for users of an exercise system or connected fitness platform. The network environment 100 can facilitate fitness as a service (FAAS), such as by providing one or more services to users via the network environment 100.

The network environment 100 includes an activity environment 102, where a user 105 is performing an exercise activity. The exercise activity performed by the user 105 can include a variety of different workouts, activities, actions, and/or movements, such as movements associated with stretching, doing yoga, lifting weights, rowing, running, cycling, jumping, dancing, sports movements (e.g., throwing a ball, pitching a ball, hitting, swinging a racket, swinging a golf club, kicking a ball, hitting a puck), and so on.

The exercise machine 110 can assist or facilitate the user 105 to perform the movements and/or can present interactive content to the user 105 when the user 105 performs the activity. For example, the exercise machine 110 can be a stationary or exercise bicycle, a stationary rower or rowing machine, a treadmill, a weight or strength machine, or other machines (e.g., weight stack machines). As another example, the exercise machine 110 can be a display device that presents content (e.g., classes, dynamically changing video, audio, video games or other gamified content, instructional content, and so on) to the user 105 during an activity or workout.

The exercise machine 110 includes a media hub 120 and a user interface 125. The media hub 120, in some cases, captures images and/or video of the user 105, such as images of the user 105 performing different movements, or poses, during an activity. The media hub 120 can include a camera or cameras (e.g., an RGB camera), a camera sensor or sensors, or other optical sensors (e.g., LIDAR or structure light sensors) configured to capture the images or video of the user 105.

In some cases, the media hub 120 can capture audio (e.g., voice commands) from the user 305. The media hub 320 can include a microphone or other audio capture devices, which captures the voice commands spoken by a user during a class or other activity. The media hub 120 can utilize the voice commands to control operation of the class (e.g., pause a class, go back in a class), to facilitate user interactions (e.g., a user can vocally "high five" another user), and so on.

In some cases, the media hub 120 includes components configured to present or display information to the user 105. For example, the media hub 120 can be part of a set-top box or other similar device that outputs signals to a display (e.g., television, laptop, tablet, mobile device, and so on), such as the user interface 125. Thus, the media hub 120 can operate to both capture images of the user 105 during an activity, while also presenting content (e.g., streamed classes, workout statistics, and so on) to the user 105 during the activity. Further details regarding a suitable media hub can be found in U.S. application Ser. No. 17/497,848, filed on Oct. 8, 2021, entitled MEDIA PLATFORM FOR EXERCISE SYSTEMS AND METHODS, which is hereby incorporated by reference in their entirety.

The user interface 125 provides the user 105 with an interactive experience during the activity. For example, the user interface 125 can present user-selectable options that identify live classes available to the user 105, pre-recorded classes available to the user 105, historical activity information for the user 105, progress information for the user 105, instructional or tutorial information for the user 105, and other content (e.g., video, audio, images, text, and so on), that is associated with the user 105 and/or activities performed (or to be performed) by the user 105.

The exercise machine 110, the media hub 120, and/or the user interface 125 can send or receive information over a network 130, such as a wireless network. Thus, in some cases, the user interface 125 is a display device (e.g., attached to the exercise machine 110), that receives content from (and sends information, such as user selections) an exercise content system 135 over the network 130. In other cases, the media hub 120 controls the communication of content to/from the exercise content system 135 over the network 130 and presents the content to the user via the user interface 125.

The exercise content system 135, located at one or more servers remote from the user 105, can include various content libraries (e.g., classes, movements, tutorials, and so on) and perform functions to stream or otherwise send content to the machine 110, the media hub 120, and/or the user interface 125 over the network 130.

In addition to a machine-mounted display, the display device 125, in some embodiments, can be a mobile device associated with the user 105. Thus, when the user 105 is performing activities outside of the activity environment 102 (such as running, climbing, and so on), a mobile device (e.g., smart phone, smart watch, or other wearable device), can present content to the user 105 and/or otherwise provide the interactive experience during the activities.

In some embodiments, a classification system 140 communicates with the media hub 120 to receive images and perform various methods for classifying or detecting poses and/or exercises performed by the user 105 during an activity. The classification system 140 can be remote from the media hub 120 (as shown in FIG. 1) or can be part of the media hub 120 (e.g., contained by the media hub 120).

The classification system 140 can include a pose detection system 142 that detects, identifies, and/or classifies poses performed by the user 105 and depicted in one or more images captured by the media hub 120. Further, the classification system 140 can include an exercise detection system 145 that detects, identifies, and/or classifies exercises or movements performed by the user 105 and depicted in the one or more images captured by the media hub 120.

Various systems, applications, and/or user services 150 provided to the user 105 can utilize or implement the output of the classification system 140, such as pose and/or exercise classification information. For example, a follow along system 152 can utilize the classification information to determine whether the user 105 is "following along" or otherwise performing an activity being presented to the user 105 (e.g., via the user interface 125).

As another example, a lock on system 154 can utilize the person detection information and the classification information to determine which user, in a group of users, to follow or track during an activity. The lock on system 154 can identify certain gestures performed by the user and classified by the classification system 140 when determining or selecting the user to track or monitor during the activity.

Further, a smart framing system 156, which tracks the movement of the user 105 and maintains the user in a certain frame over time, can utilize the person detection information when tracking and/or framing the user.

Also, a repetition counting system 158 (e.g., "rep counting system") can utilize the classification or matching techniques to determine a number of repetitions of a given movement or exercise are performed by the user 105 during a class, another presented experience, or when the user 105 is performing an activity without participation in a class or experience.

Of course, other systems can also utilize pose or exercise classification information when tracking users and/or analyzing user movements or activities. Further details regarding the classification system 140 and various systems (e.g., the follow along system 152, the lock on system 154, the smart framing system 156, the repetition counting system 150, and so on) are described herein.

In some embodiments, the systems and methods include a movements database (dB) 160. The movements database 160, which can reside on a content management system (CMS) or other system associated with the exercise platform (e.g., the exercise content system 135), can be a data structure that stores information as entries that relate individual movements to data associated with the individual movements. As is described herein, a movement is a unit of a workout or activity, and in some cases, the smallest unit of the workout or activity (e.g., an atomic unit for a workout or activity). Example movements include a push-up, a jumping jack, a bicep curl, an overhead press, a yoga pose, a dance step, a stretch, and so on.

The movements database 160 can include, or be associated with, a movement library 165. The movement library 165 includes short videos (e.g., GIFs) and long videos (e.g., ~90 seconds or longer) of movements, exercises, activities, and so on. Thus, in one example, the movements database 160 can relate a movement to a video or GIF within the movement library 165.

Various systems and applications can utilize information stored by the movements database 160. For example, a class generation system 170 can utilize information from the movements database 160 when generating, selecting, and/or recommending classes for the user 105, such as classes that target specific muscle groups.

As another example, a body focus system 175 can utilize information stored by the movements database 160 when presenting information to the user 105 that identifies how a certain class or activity strengthens or works the muscles of their body. The body focus system 175 can present interactive content that highlights certain muscle groups, displays changes to muscle groups over time, tracks the progress of the user 105, and so on.

Further, a dynamic class system 180 can utilize information stored by the movements database 160 when dynamically generating a class or classes (or generating one or more class recommendations) for the user 105. For example, the dynamic class system 180 can access information for the user 105 from the body focus system 175 and determine one or more muscles to target in a new class for the user 105. The system 180 can access the movements database 160 using movements associated with the targeted muscles and dynamically generate a new class (or recommend one or more existing classes) for the user that incorporates videos and other content identified by the database 160 as being associated with the movements.

Of course, other systems or user services can utilize information stored in the movements database 160 when generating, selecting, or otherwise providing content to the user 105. Further details regarding the movements database 160 and various systems (e.g., the class generation system 170, the body focus system 175, the dynamic class system 180, and so on) will be described herein.

Figure 1B:
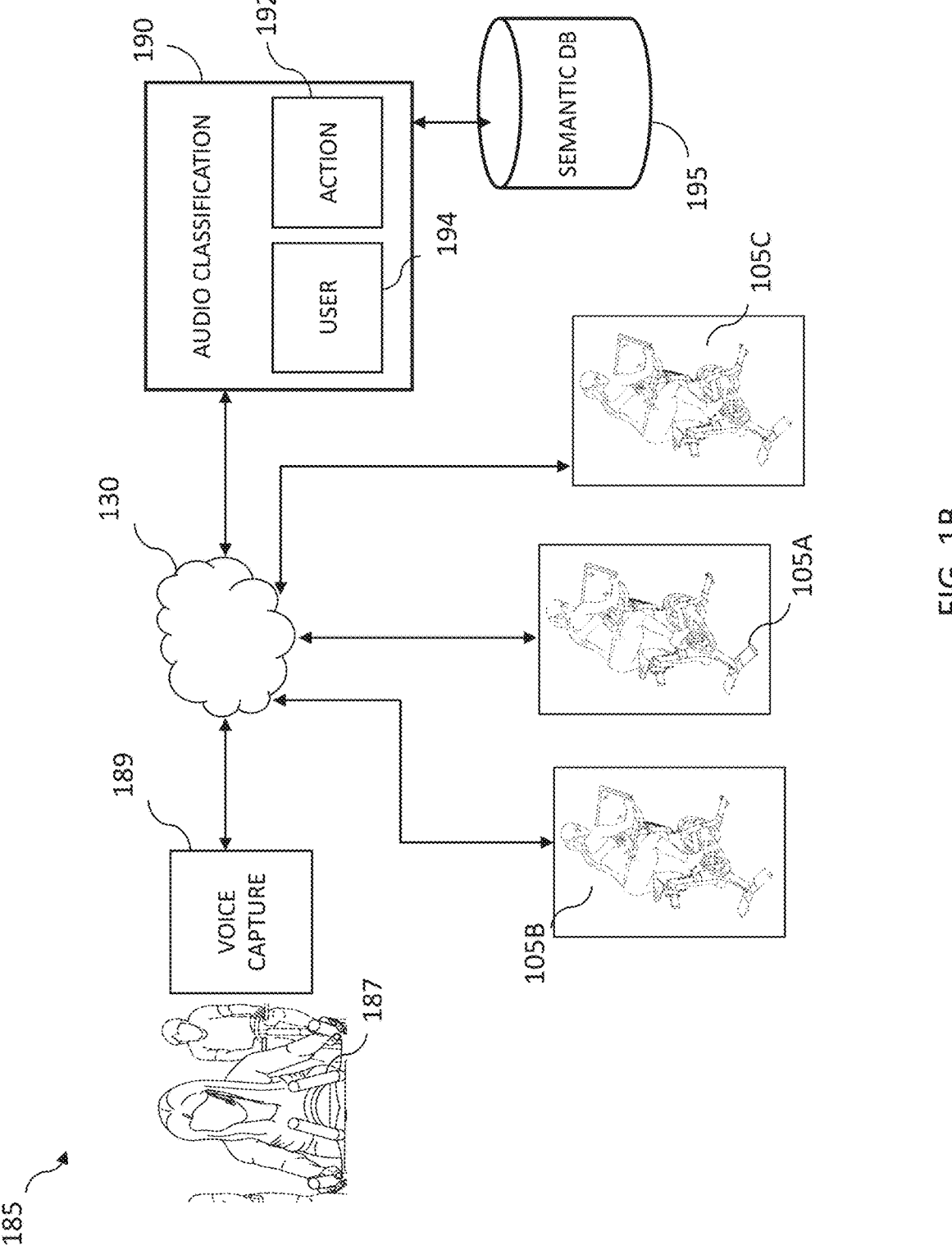
FIG. 1B is a block diagram illustrating a suitable network environment for users participating in a live exercise class presented by the connected fitness platform.

FIG. 1B expands upon the network environment depicted in FIG. 1A to present a suitable network environment 185 for users participating in a live exercise class presented by the connected fitness platform. For example, users 105A, 105B, and 105C can be part of a live exercise class taught by an instructor 187. During the class, the instructor vocalizes or speaks instructions, encouragement, congratulations, guidance, and so on, related to the class and the users 105A-C. The instructor may speak or vocalize one or more words, one or more phrases, keywords, and so on.

A voice capture system 189, which can be part of a computing system associated with the instructor 187 (e.g., a class management system) can capture or record the commands and other utterances or audio spoken by the instructor 187 during the class. The voice capture system 189 can transmit the captured audio (e.g., a voice snippet or audio snippet) to an audio classification system 190, such as over the network 130 to a remotely located audio classification system 190 that is part of the exercise content system 135 or other components or servers of the network environment 100.

The audio classification system 190 includes various components configured or programmed to receive captured audio (or text-based transcripts of the captured audio) and perform actions associated with certain names or phrases within the captured audio, such as usernames for users/members of the live class (e.g., one or more of the users 105A-C). Although shown as a system that separate or remote from the exercise machines 105A-C, in some cases aspects of the system 190 may be supported or integrated into the exercise machines 105A-C.

The system 190 can include a user module 194, which is programmed and/or configured to identify or otherwise determine a certain username or handle for one or more users within a live class has been spoken or uttered by the instructor 187 within the captured audio. The user module 194 can utilize or access a semantic database 195, which can include entries, tables, or data objects that relate users and their usernames (e.g., the users of the live class) to semantic representations (e.g., one or more tokens) of the usernames.

Table 1 illustrates a few example entries or data objects contained by the semantic database 195:

TABLE 1

| Username | Token1 | Token2 | Token3 |
|---|---|---|---|
| @wrathofkon | wrath | kon | |
| @dancearmstrong | dance | arm | Strong |
| #workingmomsofpeloton | working | moms | peloton |

Thus, the username "Dance Armstrong" can be stored as three different representations or tokens—"dance," "arm," and "strong"), and the hashtag or group of users "#workingmomsofpeloton" can be stored as multiple tokens—"working" and "moms." Of course, usernames or groupings can be stored as fewer or more tokens. Thus, the semantic database 195 enables the system 190 to store representations of usernames, which can be uniquely spelled or phrased and difficult to capture or extract from a voice or audio snippet. The system 190 may use the database 195 to identify or determine when that username is spoken by an instructor during a class.

The audio classification system 190 also includes an action module 192, which is programmed and/or configured to identify, select, and/or perform actions based on the determination that a username within a live class was spoken by the instructor. For example, as described herein, the action module 192 can receive an indication that a certain username was mentioned in class from the user module 194, access context information associated with the username (e.g., other audio providing an intent or context as to why the instructor mentioned the user), and select an action (e.g., take a picture of the user, display a congratulatory message to the user) to be performed during the live class. Further details regarding the selection of actions and/or types of actions are described herein.

FIGS. 1A-1B and the components, systems, servers, and devices depicted herein provide a general computing environment and network within which the technology described herein can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network or cloud 130 can be any network, ranging from a wired or wireless local area network (LAN) to a wired or wireless wide area network (WAN), to the Internet or some other public or private network, to a cellular (e.g., 4G, LTE, or 5G network), and so on. While the connections between the various devices and the network 130 and are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices, wearable devices, or mobile devices (e.g., smart phones, tablets, laptops, smart watches), all manner of cellular or mobile phones, multi-processor systems, micro-processor-based or programmable consumer electronics, set-top boxes, network PCs, mini-computers, mainframe computers, AR/VR devices, gaming devices, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), or they may be provided on any analog or digital network (packet switched, circuit switched, or other scheme). Portions of the system may reside on a server computer, while corresponding portions may reside on a client computer such as an exercise machine, display device, or mobile or portable device, and thus, while certain hardware platforms are described herein, aspects of the system are equally applicable to nodes on a network. In some cases, the mobile device or portable device may represent the server portion, while the server may represent the client portion.

Examples of Identifying Users within Spoken Words

Figure 2:
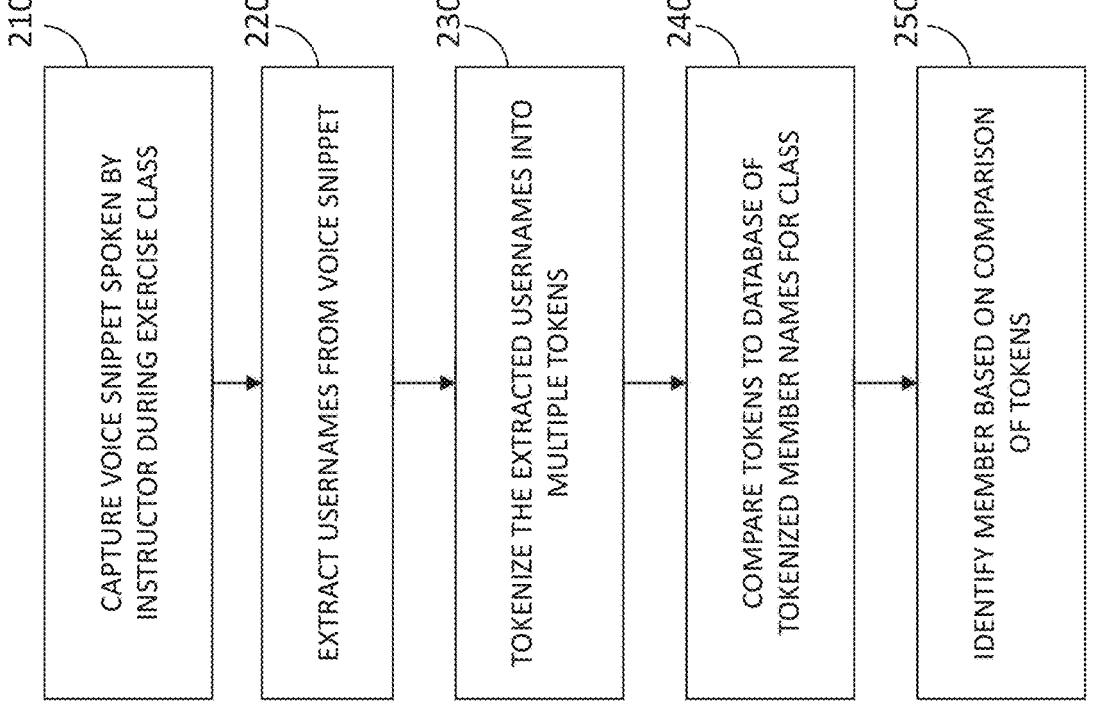
FIG. 2 is a flow diagram illustrating an example method of identifying a member associated with a voice command within the connected fitness platform.

As described herein, the audio classification system 190 can perform various methods or processes to determine whether a username, grouping (e.g., a hashtag) or other name or phrase is spoken or uttered by an instructor during a live class. FIG. 2 is a flow diagram illustrating an example method 200 of identifying a member associated with a voice command within the connected fitness platform. The method 200 may be performed by the system 190 and, accordingly, is described herein merely by way of reference thereto. It will be appreciated that the method 200 may be performed on any suitable hardware.

In operation 210, the system 190 captures a voice snippet spoken by an instructor during a live class. For example, the system 190 can receive from the voice capture system 189 a voice snippet or text-based transcript (e.g., a text string) of the voice snippet associated with the live class.

In operation 220, the system 190 extracts a username from the voice snippet. For example, the system 190 can utilize context or other indicators within the voice snippet to extract certain utterances or phrases from the voice snippet as potential or possible usernames (or other names or identifiers) spoken by the instructor.

The instructor may speak one or more keywords associated with identifying users of the live exercise class ("happy 500$^{th}$ class to . . . , "shout out to . . . ", "happy birthday to . . . ", and so on). Such keywords can act as a cue or signal that the instructor is going to then say a username or hashtag to be identified.

In some cases, the system 190 may react to other indicators or cues, such as movement or visual cues. For example, the instructor may perform a certain hand motion, body movement (e.g., sit back on a saddle or grab a towel), look into a certain camera, or other movements. These movements may indicate the instructor is about to say a few usernames (e.g., during a relaxed or less intense segment of the class).

In operation 230, the system 190 tokenizes the extracted username into multiple tokens. For example, the user module 194 can perform semantic processing (e.g., natural language processing, or NLP) on the voice snippet or extracted portion of the voice snippet to generate multiple tokens that represent the username (e.g., the name spoken by the instructor). As described herein, a token can represent a part of a name (e.g., a syllable).

Figure 3A:
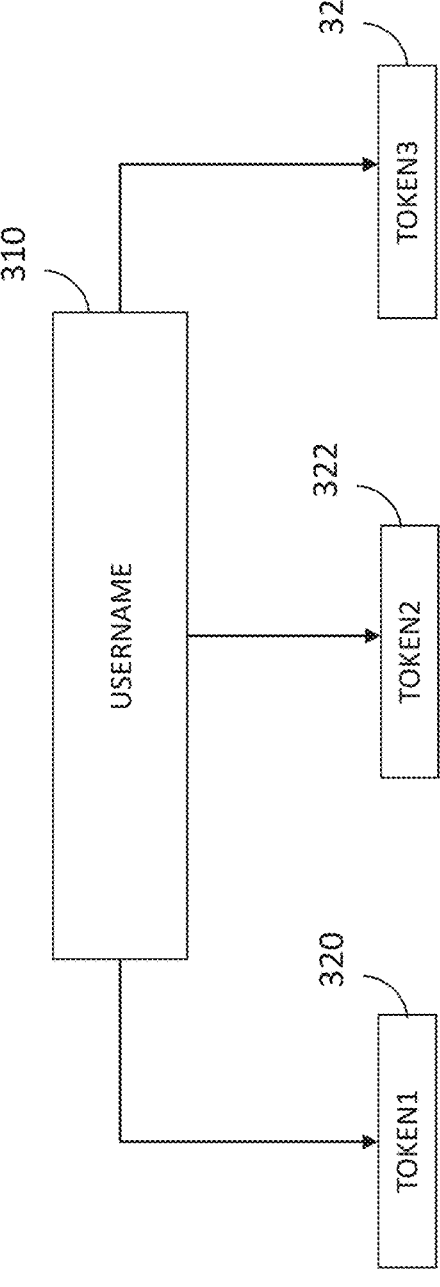
FIGS. 3A-3B are diagrams illustrating the tokenization of a name or group into separate tokens.
Figure 3B:
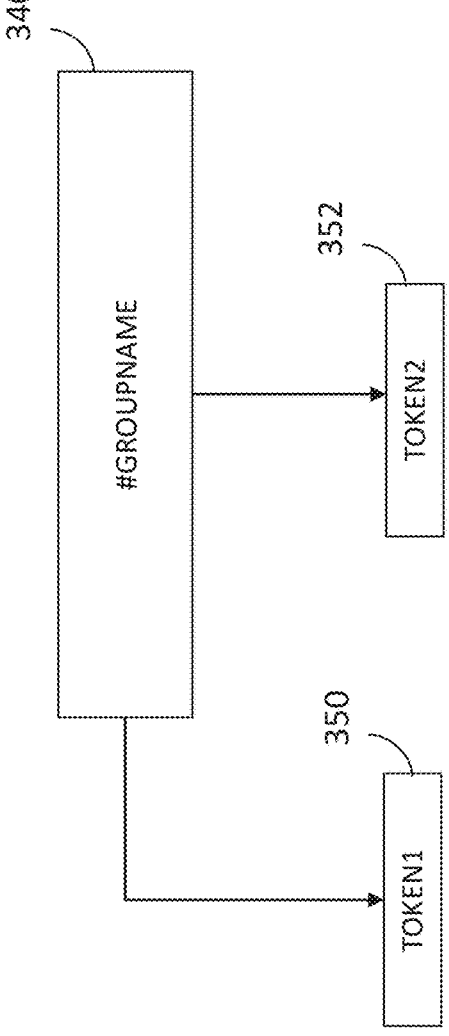

FIGS. 3A-3B are diagrams illustrating the tokenization of spoken names into separate tokens. For example, FIG. 3A represents a mapping 310 of a username 310 to multiple representative tokens 320, 322, 324. As another example, FIG. 3B represents a mapping 330 of a group name 340 (e.g., a hashtag that relates or group multiple members to one another) to multiple representative tokens 350, 352.

Returning to FIG. 2, in operation 240, the system 190 compares the tokens to a database of tokenized usernames, such as the semantic database 195, which includes entries mapping or relating tokens to usernames or other user/member identifiers. For example, the user module 194 can perform a query of the database 195 to return any entries that match one or more tokens representing an extracted username.

In operation 250, the system 190 determines or identifies a member or user of the exercise class based on the comparison of tokens. For example, the user module 194 queries the database for any members associated with a certain token or tokens and returns usernames that match the tokens in the query.

In some cases, the database 195 can include a table or tables that is generated in real-time for the specific online class—where a subset of all users of a connected fitness platform are contained in the generated table. The user module 194, during the class, performs the queries against the table generated for the class, to constrain the queries to members known to be in the class.

In some cases, the database 195 can maintain various global lists or tables of usernames or groupings and perform queries against the different global lists or tables. The global lists can be maintained and updated over time, and relate members based on common interests or representations, such as via hashtags (e.g., #workingmomsofPeloton, #powerzonepack, and so on), or based on certain achievements or milestones within the platform (e.g., a dynamically changing table that includes members on their 100$^{th}$ or Nth ride), and so on.

Figure 4:
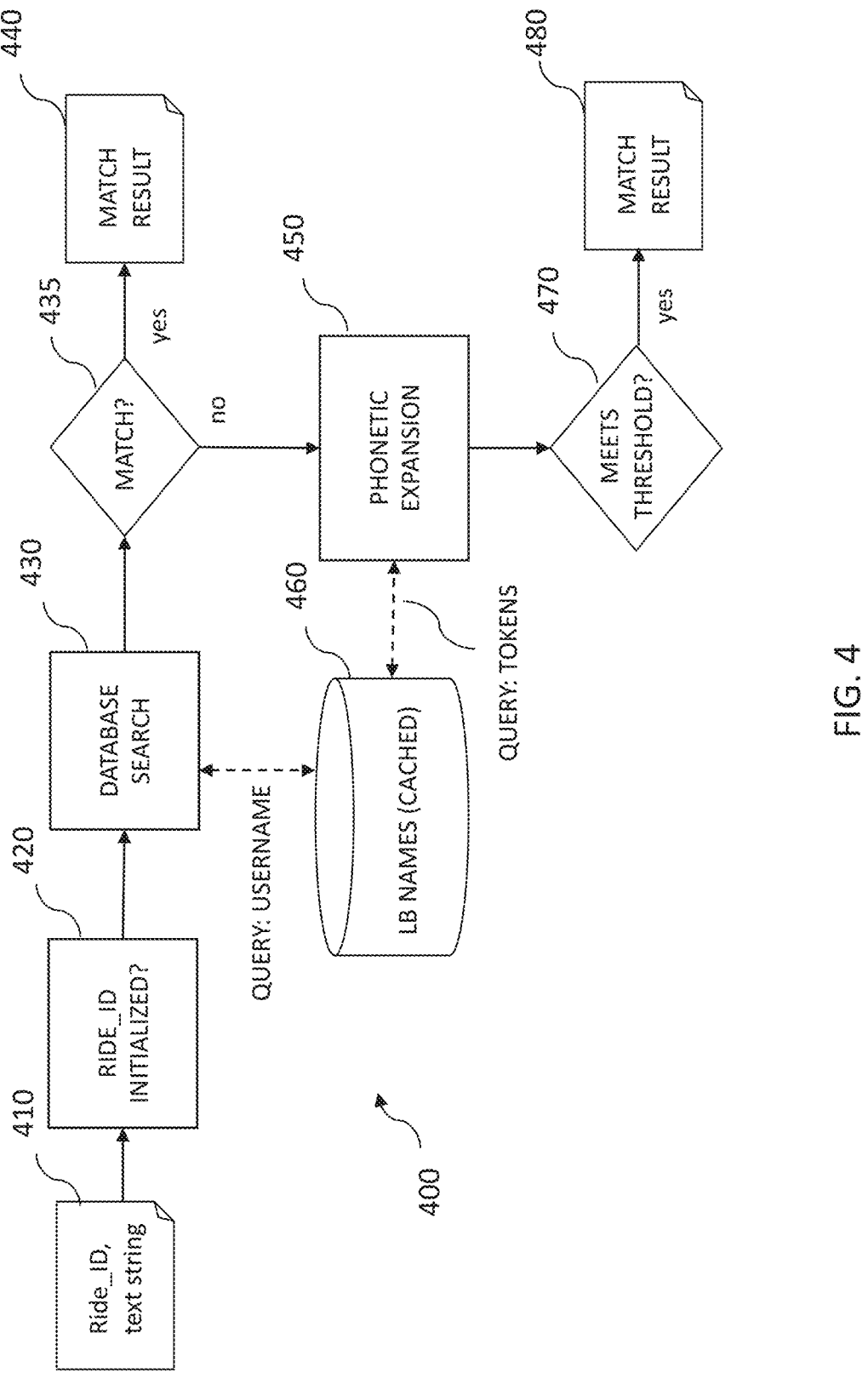
FIG. 4 is a diagram illustrating example data flows when identifying a member associated with a voice command within the connected fitness platform.

FIG. 4 is a diagram 400 illustrating example data flows when identifying a member associated with a voice command within the connected fitness platform. In some cases, the audio classification system 190 may include some or all aspects of the data flows depicted in the diagram 400.

First, information 410 (e.g., a text string representing a username, various identifiers) within a captured voice or audio snippet and extracted from the snippet is received and initialized 420 by the system 190. Once initialized, the system 190 performs an initial database search 430 of a semantic database 460 (e.g., a database of leaderboard names for a class). For example, the system performs a query, using the extracted text string, of username variations related to the text string. When there is a match 435 found during the query, the system 190 outputs a match result 440, such as the matched username.

In some cases, the system 190 may utilize machine learning (ML) models to detect initial candidate usernames via context words spoken before/after the candidate usernames. The system 190 may filter the detected candidates to filter names or entries within the database 195 or 460.

However, when there is no match in the initial query, the system 450 performs a phonetic expansion of the text string, such as a tokenization of the text string into different tokens, as described herein. The system 190 performs a subsequent query of entries of the database 460 using the different tokens for the text string. The system 190 may then determine any matches, or match probabilities, and if the match probabilities meet a threshold (e.g., a number of matching tokens is above a certain percentage), the system 190 identifies a username as a match, and outputs the username as a match result 480.

The system 190 may perform such operations using various modules and application programming interfaces (APIs). For example, the system 190 may include an orchestrator module that performs the different operations in response to receiving or generating a text string (e.g., a .vtt file). The orchestrator, which may be implemented as or by the user module 194, can access or call various APIs to provide or obtain information. Example operations include an operation to access the databases 195 or 460, an operation to perform a phonetic or tokenized search, an operation to access a leaderboard list (e.g., a list of participants of a live class via a leaderboard module), and so on.

Thus, the system 190 can implement various modules and APIs when determining usernames, or hashtags, spoken during live exercise classes.

Examples of Performing Actions for Identified Users

As described herein, in response to identified, detected, and/or determined voice commands, the systems and methods perform actions for members. For example, the systems and methods can present content to a member that is called out by the instructor during the class, such as an animated visual presentation via the member's display that overlays the presentation of the class.

Figure 5:
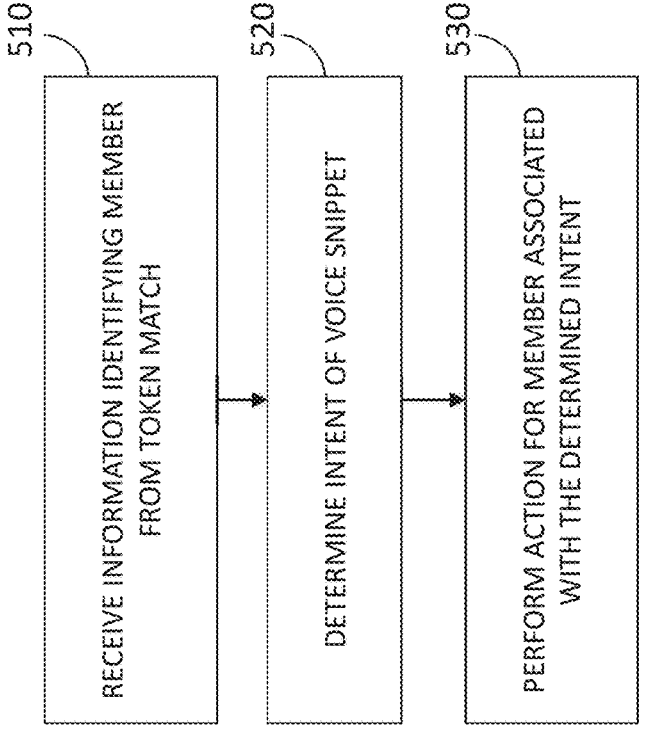
FIG. 5 is a flow diagram illustrating an example method for performing an action for a member of a live exercise class within the connected fitness platform.

FIG. 5 is a flow diagram illustrating an example method 500 for performing an action for a member of a live exercise class within the connected fitness platform. The method 500 may be performed by the system 190 and, accordingly, is described herein merely by way of reference thereto. It will be appreciated that the method 500 may be performed on any suitable hardware.

In operation 510, the system 190 receives information identifying a member or username spoken during a live class. For example, the action module 192 receives from the user module 194 a confirmation that a certain user was mentioned during the class by the instructor 187.

In operation 520, the system 190 determines an intent within the voice snippet. For example, the action module 192 can determine the instructor has uttered one or more celebratory words or phrases (e.g., "1000$^{th}$ ride" or "happy birthday") or other intents (e.g., words/phrases that represent milestones, support, and so on).

In operation 530, the system 190 perform an action for the member that is associated with the determined intent of the spoken words. For example, the action module 192 can select an action that is associated with the intent and cause the action to be performed for the user.

In some examples, the action module 192 can cause a user interface associated with the member to capture a current moment during the class (e.g., a photo or video of the member during the class, a snapshot of the leaderboard or other class state, and so on), can facilitate a social media or network post associated with the member and/or the class, can notify other members associated with the member ("friends" or "connections" to the member) of the event or achievement, can display content associated with the spoken words, and so on.

As described herein, the action module 192 can take (or cause to take) a photo, video, or screenshot of the member at a time within which the member was mentioned during the class. The action module 192, thus, seeks to capture a moment in time during the class, memorializing the moment with captured photos or videos of the member (e.g., via a camera on their exercise machine or mobile device) and/or captured screens of the user interface displayed during the class at that moment in time. The action module 192 can then share these artifacts of the moment on behalf of the member, such as to other members, to social media, to contacts of the member, and so on.

Figure 6:
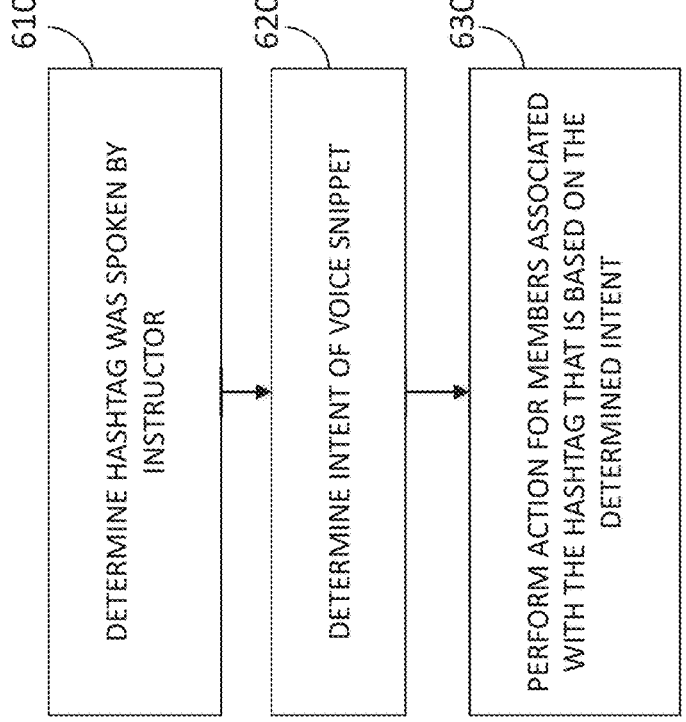
FIG. 6 is a flow diagram illustrating an example method for performing an action for members of a live exercise class within the connected fitness platform that are associated with a spoken hashtag or phrase.

As described herein, the system 190 can perform actions for members and groups of members, such as members grouped by a hashtag or common identifier. FIG. 6 is a flow diagram illustrating an example method 600 for performing an action for members of a live exercise class within the connected fitness platform that are associated with a spoken hashtag or phrase. The method 600 may be performed by the system 190 and, accordingly, is described herein merely by way of reference thereto. It will be appreciated that the method 600 may be performed on any suitable hardware.

In operation 610, the system 190 receives information identifying a hashtag spoken during a live class. For example, the action module 192 receives from the user module 194 a confirmation that a certain hashtag was mentioned during the class by the instructor 187.

In operation 620, the system 190 determines an intent within the voice snippet. For example, the action module 192 can determine the instructor has uttered one or more intents (e.g., words/phrases that represent milestones, support, and so on) associated with the hashtag.

In operation 630, the system 190 perform an action for members associated with the hashtag that is associated with the determined intent of the spoken words. For example, the action module 192 can select an action that is associated with the intent and cause the action to be performed for the group of members.

As an example, an instructor of a live cycling class held during the morning can shout out the hashtag #earlybirdsgettheform, which causes the action module 192 to perform an action capturing the moment during the class when the hashtag was mentioned. The system 190 can share photos of those members to the other members of the hashtag, providing an enhanced experience and motivation for the members that share the hashtag, among other benefits.

Figure 7A:
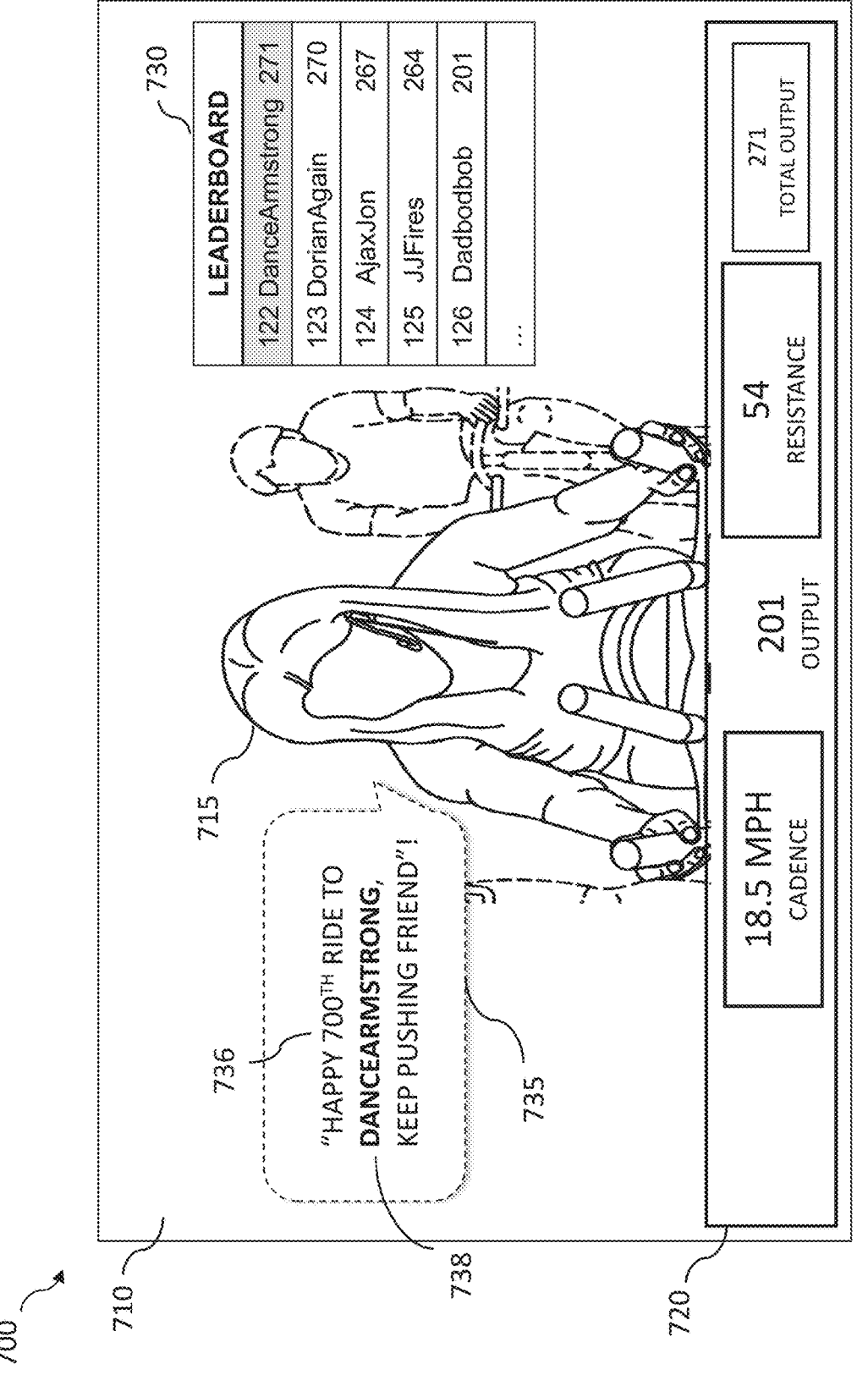
FIGS. 7A-7B are diagrams illustrating an example user interface presented to a member during a live exercise class.
Figure 7B:
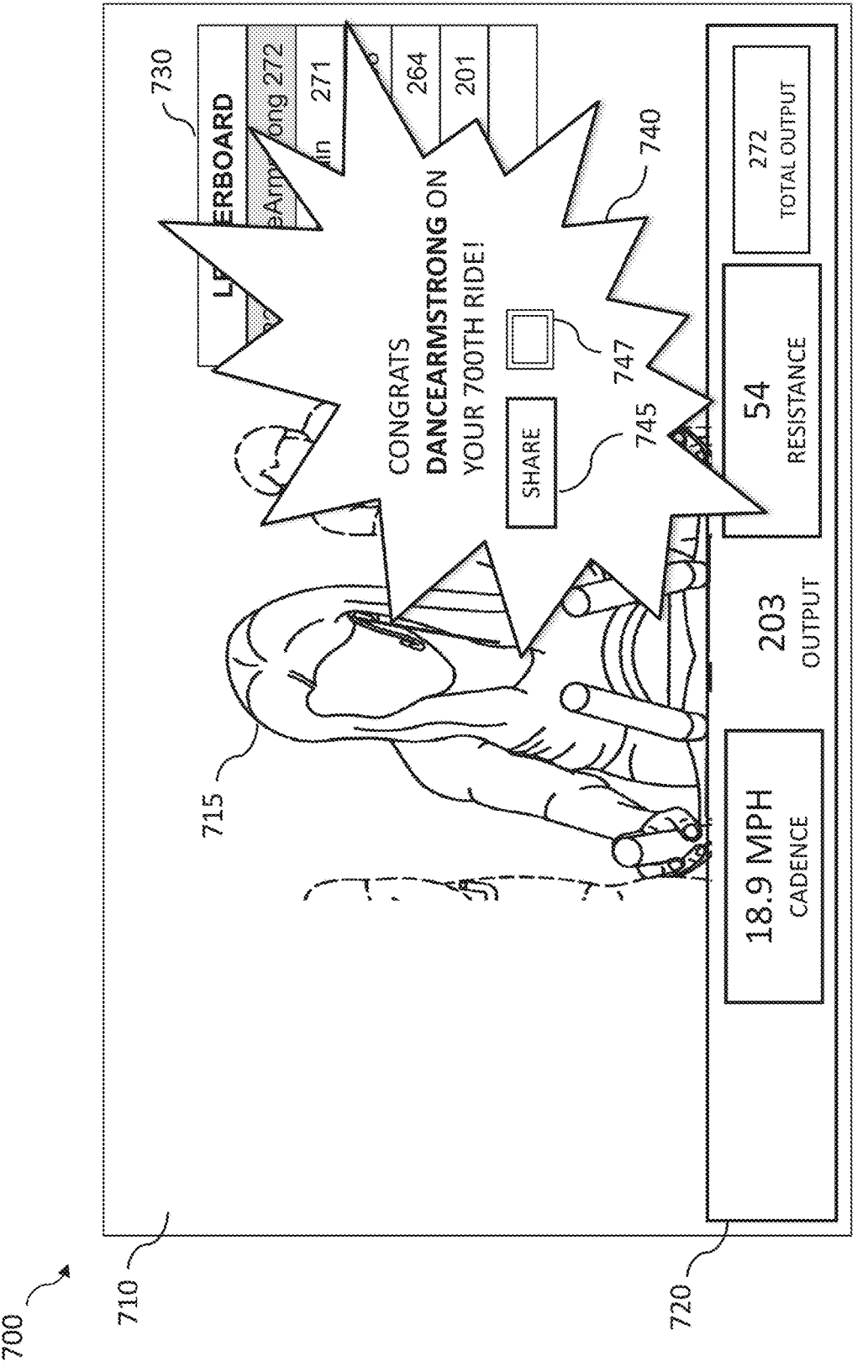

FIGS. 7A-7B are diagrams illustrating an example user interface 700 presented to a member during a live exercise class. For example, the user interface 700 presents a live exercise class 710 with an instructor 715 leading the class. A user, or member, having the username of "DanceArmstrong" is participating in the class via their exercise machine (e.g., in this case an exercise or stationary bicycle). The user interface 700 presents class metrics 720 (e.g., a current and cumulative output, cadence, resistance, and so on) and a leaderboard 730 that ranks all participants of the class 710.

The instructor 715 speaks throughout the class. The instructor 715 may provide instructions for cadence or resistance ranges, may provide motivational instructions of commentary, may introduce music, and often announces milestones or achievements for users/members actively taking the class (e.g., giving shout outs for certain members). For example, as depicted, the instructor 715 speaks the following phrase 735, "Happy 700$^{th}$ ride to DanceArmstrong, keep pushing friend!", during the class.

The system 190, as described herein, captures a voice snippet of the words spoken by the instructor, using a first portion (e.g., "happy-[ ]-ride") 736 as a cue or context that a username is going to be spoken, and capturing the text that follows ("Dancearmstrong") 738. The username is extracted, as described herein, and the system 190 identifies the user "DanceArmstrong" as the user represented by the words 735 spoken by the instructor 715.

The system 190 may then perform an action based on the identified user, as described herein. For example, FIG. 7B depicts a visual graphical element 740 that is displayed via the user interface 700 of the user having the username DanceArmstrong. The graphical element 740 presents a congratulatory message to the user, as well as various selectable elements, such as a share button 745, a photo (or screen capture) button 747, and so on.

Of course, the system 190 may perform other actions, such as actions that capture images of the user during the activity, actions that present audio or other visual content, actions that capture a video snippet of the class during the shout out by the instructor, actions that automatically share content to a social network associated with the user, and so on.

Example Embodiments of the Technology

As described herein, in response to identified, detected, and/or determined voice commands, the systems and methods can perform actions for members, such as during live exercise classes where the members are participants.

In some embodiments, a method performed by a connected fitness platform that streams exercise classes to members of the connected fitness platform via exercise machines associated with the members, the method comprising capturing a voice snippet spoken by an instructor during a live exercise class, wherein the live exercise class is streamed to multiple remote exercise machines that present the live exercise class to members of the connected fitness platform that are performing exercise activities while participating in the live exercise class, extracting a username from the voice snippet, tokenizing the extracted username into multiple tokens, comparing the multiple tokens to a database of tokenized usernames associated with the live exercise class, and identifying a specific member that is participating in the live exercise class based on the comparison.

In some cases, identifying a member of the live exercise class based on the comparison includes matching at least two tokens of the multiple tokens to tokens contained by the database of tokenized usernames associated with the live exercise class.

In some cases, extracting a username from the voice snippet includes identifying a context during the live exercise class within which the instructor provides the voice snippet.

In some cases, the method includes performing an action associated with the identified specific member during the live exercise class.

In some cases, the identified specific member is participating in the live exercise class via an associated exercise machine that presents information for the live exercise class, and the method includes causing the exercise machine associated with the identified specific member to display a graphical element during the live exercise class that indicates the instructor has spoken the username representing the identified specific member.

In some cases, the identified specific member is participating in the live exercise class via an associated exercise machine that presents information for the live exercise class, and the method includes causing the exercise machine associated with the identified specific member to capture an image of the identified specific member during the live exercise class.

In some cases, the identified specific member is participating in the live exercise class via an associated exercise machine that displays a leaderboard for the live exercise class, and the method includes causing the exercise machine associated with the identified specific member to display a graphical element overlaying the leaderboard during the live exercise class that indicates the instructor has spoken the username representing the identified specific member.

In some cases, the database of tokenized usernames associated with the live exercise class is generated after commencement of the live exercise class.

In some cases, extracting a username from the voice snippet includes determining the instructor has spoken one or more keywords associated with identifying users of the live exercise class and capturing the voice snippet in response to the determination.

In some cases, extracting a username from the voice snippet includes determining the instructor has performed a certain movement associated with identifying users of the live exercise class and capturing the voice snippet in response to the determination.

In some embodiments, a non-transitory, computer-readable medium whose contents, when executed by an exercise machine, cause the exercise machine to perform a method, the method comprising presenting an exercise class to a user of the exercise machine, receiving an indication from a remote server that an instructor of the exercise class has spoken a word or phrase that represents the user of the exercise machine, and performing an action via the exercise machine based on the received indication.

In some cases, performing the action via the exercise machine includes displaying a graphical element during the exercise class that indicates the instructor has spoken the word or phrase that represents the user.

In some cases, performing the action via the exercise machine includes displaying a graphical element overlaying a leaderboard during the live exercise class that indicates the instructor has spoken the word or phrase that represents the user.

In some cases, performing the action via the exercise machine includes causing the exercise machine to capture an image of the user during the live exercise class.

In some cases, the word or phrase is a username that represents the user.

In some cases, the word or phrase is a hashtag that represents the user.

In some cases, the word or phrase is associated with an achievement realized by the user during the exercise class.

In some embodiments, a system comprises a processor and a memory coupled with the processor, the processor configured to cause the system to receive a text string based on one or more words spoken by an instructor of a live exercise class, wherein the live exercise class is streamed to multiple remote exercise machines that present the live exercise class to users performing exercise activities associated with the live exercise class, tokenize the text string into multiple tokens, compare the multiple tokens to a database of tokenized usernames associated with the live exercise class, and identify a member that is participating in the live exercise class based on the comparison.

In some cases, the text string represents a username or hashtag spoken by the instructor of the live exercise class.

In some cases, the database of tokenized usernames associated with the live exercise class is generated after commencement of the live exercise class.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the electric bike and bike frame may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A method performed by a connected fitness platform that streams exercise classes to members of the connected fitness platform via exercise machines associated with the members, the method comprising:

capturing a voice snippet spoken by an instructor during a live exercise class, wherein the live exercise class is streamed to multiple remote exercise machines that present the live exercise class to members of the connected fitness platform that are performing exercise activities while participating in the live exercise class;

extracting a username from the voice snippet;

tokenizing the extracted username into multiple tokens;

comparing the multiple tokens to a database of tokenized usernames associated with the live exercise class; and identifying a specific member that is participating in the live exercise class based on the comparison.

2. The method of claim 1 wherein identifying a specific member of the live exercise class based on the comparison includes matching at least two tokens of the multiple tokens to tokens contained by the database of tokenized usernames associated with the live exercise class.

3. The method of claim 1, wherein extracting a username from the voice snippet includes identifying a context during the live exercise class within which the instructor provides the voice snippet.

4. The method of claim 1, further comprising:

performing an action associated with the identified specific member during the live exercise class.

5. The method of claim 1, wherein the identified specific member is participating in the live exercise class via an associated exercise machine that presents information for the live exercise class, the method further comprising:

causing the exercise machine associated with the identified specific member to display a graphical element during the live exercise class that indicates the instructor has spoken the username representing the identified specific member.

6. The method of claim 1, wherein the identified specific member is participating in the live exercise class via an associated exercise machine that presents information for the live exercise class, the method further comprising:

causing the exercise machine associated with the identified specific member to capture an image of the identified specific member during the live exercise class.

7. The method of claim 1, wherein the identified specific member is participating in the live exercise class via an associated exercise machine that displays a leaderboard for the live exercise class, the method further comprising:

causing the exercise machine associated with the identified specific member to display a graphical element overlaying the leaderboard during the live exercise class that indicates the instructor has spoken the username representing the identified specific member.

8. The method of claim 1, wherein the database of tokenized usernames associated with the live exercise class is generated after commencement of the live exercise class.

9. The method of claim 1, wherein extracting a username from the voice snippet includes:

determining the instructor has spoken one or more keywords associated with identifying users of the live exercise class; and capturing the voice snippet in response to the determination.

10. The method of claim 1, wherein extracting a username from the voice snippet includes:

determining the instructor has performed a certain movement associated with identifying users of the live exercise class; and capturing the voice snippet in response to the determination.

11. A system, comprising:

a processor; and a memory coupled with the processor, the processor configured to cause the system to:

receive a text string based on one or more words spoken by an instructor of a live exercise class, wherein the live exercise class is streamed to multiple remote exercise machines that present the live exercise class to users performing exercise activities associated with the live exercise class;

tokenize the text string into multiple tokens;

compare the multiple tokens to a database of tokenized usernames associated with the live exercise class; and identify a member that is participating in the live exercise class based on the comparison.

12. The system of claim 11, wherein the text string represents a username or hashtag spoken by the instructor of the live exercise class.

13. The system of claim 11, wherein the database of tokenized usernames associated with the live exercise class is generated after commencement of the live exercise class.

14. A non-transitory, computer-readable medium whose contents, when executed by a computing system, cause the computing system to perform a method, the method comprising:

capturing a voice snippet spoken by an instructor during a live exercise class streamed to multiple remote exercise machines that present the live exercise class to members performing exercise activities while participating in the live exercise class;

extracting a username from the voice snippet;

tokenizing the extracted username into multiple tokens;

comparing the multiple tokens to a database of tokenized usernames associated with the live exercise class; and identifying a specific member that is participating in the live exercise class based on the comparison.

15. The non-transitory, computer-readable medium of claim 14, wherein identifying the specific member of the live exercise class based on the comparison includes matching at least two tokens of the multiple tokens to tokens contained by the database of tokenized usernames associated with the live exercise class.

16. The non-transitory, computer-readable medium of claim 14, wherein extracting a username from the voice snippet includes identifying a context during the live exercise class within which the instructor provides the voice snippet.

17. The non-transitory, computer-readable medium of claim 14, further comprising:

performing an action associated with the identified specific member during the live exercise class.

18. The metho non-transitory, computer-readable medium of claim 14, wherein the identified specific member is participating in the live exercise class via an associated exercise machine that presents information for the live exercise class, the method further comprising:

causing the exercise machine associated with the identified specific member to display a graphical element during the live exercise class that indicates the instructor has spoken the username representing the identified specific member.

19. The non-transitory, computer-readable medium of claim 14, wherein the identified specific member is participating in the live exercise class via an associated exercise machine that presents information for the live exercise class, the method further comprising:

causing the exercise machine associated with the identified specific member to capture an image of the identified specific member during the live exercise class.

20. The non-transitory, computer-readable medium of claim 14, wherein the identified specific member is participating in the live exercise class via an associated exercise machine that displays a leaderboard for the live exercise class, the method further comprising:

causing the exercise machine associated with the identified specific member to display a graphical element overlaying the leaderboard during the live exercise class that indicates the instructor has spoken the username representing the identified specific member.

* * * * *